US012585456B2

(12) United States Patent (10) Patent No.: US 12,585,456 B2
Sato (45) Date of Patent: Mar. 24, 2026

(54) PARKING POSITION DETERMINATION DEVICE

(71) Applicant: TOYOTA JIDOSHA KABUSHIKI KAISHA, Toyota (JP)

(72) Inventor: Fumiya Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 18/408,787

(22) Filed: Jan. 10, 2024

(65) Prior Publication Data

US 2024/0303065 A1 Sep. 12, 2024

(30) Foreign Application Priority Data

Mar. 7, 2023 (JP) ................................. 2023-034505

(51) Int. Cl.
| | |
|---|---|
| *G06F 8/65* | (2018.01) |
| *B60L 53/66* | (2019.01) |
| *B60W 60/00* | (2020.01) |
| *G08G 1/14* | (2006.01) |

(52) U.S. Cl.
CPC ................. *G06F 8/65* (2013.01); *B60L 53/66* (2019.02); *B60W 60/001* (2020.02); *G08G 1/145* (2013.01); *B60W 2556/45* (2020.02)

(58) Field of Classification Search
CPC .......... G06F 8/65; G06F 11/00; B60W 50/10; B60W 50/14; G06Q 20/40145; H04L 67/34; H04L 67/12; H04L 9/3263; G08G 1/14
See application file for complete search history.

(56) References Cited

U.S. PATENT DOCUMENTS

| | | | |
|---|---|---|---|
| 9,884,646 | B2 | 2/2018 | Tomozawa et al. |
| 9,919,735 | B2 | 3/2018 | Tomozawa et al. |
| 2010/0039069 | A1 | 2/2010 | Niwa et al. |
| 2013/0079950 | A1* | 3/2013 | You .......................... H04L 67/12 |
| | | | 701/1 |

(Continued)

FOREIGN PATENT DOCUMENTS

| | | | | | |
|---|---|---|---|---|---|
| CN | 206236283 | U | * | 6/2017 | ............... G08G 1/14 |
| CN | 112911548 | A | * | 6/2021 | ........... H04L 9/3263 |

(Continued)

*Primary Examiner* — Yuri Kan
(74) *Attorney, Agent, or Firm* — SoraIP, Inc.

(57) ABSTRACT

A parking position determination device determines a parking position of a vehicle parked for power supply in a parking lot including a first parking space provided with a first power supply facility having a data communication function that provides update data for software of an in-vehicle ECU to the vehicle, and a second parking space provided with a second power supply facility that does not have the data communication function. The parking position determination device includes a necessity determination unit that determines whether software update is necessary, and a parking position determination unit that determines the first parking space as the parking position of the vehicle when determination is made that the software needs to be updated, and determines the second parking space as the parking position of the vehicle when determination is made that the software does not need to be updated.

4 Claims, 3 Drawing Sheets

(56)        References Cited

U.S. PATENT DOCUMENTS

| | | | |
|---|---|---|---|
| 2019/0225267 A1 | 7/2019 | Ohtani et al. | |
| 2021/0182048 A1* | 6/2021 | Harata ................. | B60W 50/14 |
| 2021/0294591 A1 | 9/2021 | Noguchi et al. | |
| 2022/0097544 A1 | 3/2022 | Tanaami et al. | |
| 2022/0334822 A1* | 10/2022 | Sakakibara ............. | H04L 67/34 |
| 2023/0252475 A1* | 8/2023 | Gronau ........... | G06Q 20/40145 705/44 |
| 2024/0253617 A1* | 8/2024 | Takaku ................ | B60W 50/10 |

FOREIGN PATENT DOCUMENTS

| | | | | |
|---|---|---|---|---|
| JP | 2007-088929 A | | 4/2007 | |
| JP | 2009-033804 A | | 2/2009 | |
| JP | 2010-098867 A | | 4/2010 | |
| JP | 2016038634 A | * | 3/2016 | ............. G06F 11/00 |
| JP | 2021-035248 A | | 3/2021 | |
| JP | 2021-149698 A | | 9/2021 | |
| JP | 2022-056840 A | | 4/2022 | |

* cited by examiner

PARKING POSITION DETERMINATION DEVICE

CROSS-REFERENCE TO RELATED APPLICATION

This application claims priority to Japanese Patent Application No. 2023-034505 filed on Mar. 7, 2023, incorporated herein by reference in its entirety.

BACKGROUND

1. Technical Field

The present disclosure relates to a parking position determination device that determines a parking position of a vehicle in a parking lot provided with a power supply facility.

2. Description of Related Art

A technique has been proposed in which in a battery electric vehicle, data communication is performed with the battery electric vehicle by superimposing data on a power supply cable (power path) when charging an in-vehicle battery from an external power supply facility. Such a technique is described in, for example, Japanese Unexamined Patent Application Publication No. 2009-33804 (JP 2009-33804 A).

SUMMARY

Here, in a parking lot provided with a plurality of power supply facilities, a power supply facility having a data communication function for data communication with a battery electric vehicle and a power supply facility that does not have the data communication function may coexist. In such a parking lot, it is required for a vehicle that needs to perform data communication to be able to use the power supply facility having the data communication function.

Therefore, the present disclosure describes a parking position determination device capable of appropriately determining a parking position of a vehicle parked for power supply in a parking lot where the power supply facility having the data communication function and the power supply facility that does not have the data communication function coexist.

A first aspect of the present disclosure is a parking position determination device that determines a parking position of a vehicle parked for power supply in a parking lot including a first parking space provided with a power supply facility having a data communication function that provides update data for software of an in-vehicle ECU to the vehicle, and a second parking space provided with a power supply facility that does not have the data communication function, and includes: a necessity determination unit that determines whether the software needs to be updated; and a parking position determination unit that determines the first parking space as the parking position of the vehicle when determination is made that the software needs to be updated, and determines the second parking space as the parking position of the vehicle when determination is made that the software does not need to be updated.

The parking position determination device further includes a required time acquisition unit that acquires a charging time required to charge an in-vehicle battery of the vehicle, and a required update time required for the in-vehicle ECU to receive the update data from the power supply facility having the data communication function and update the software. The parking position determination unit may determine the second parking space as the parking position of the vehicle when the charging time is shorter than the required update time, even when determination is made that the software needs to be updated.

According to the aspect of the present disclosure, in the parking lot where the power supply facility having the data communication function and the power supply facility that does not have the data communication function coexist, the parking position of the vehicle parked for power supply can be appropriately determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, exemplary embodiments will be described with reference to the drawings. In each figure, the same or corresponding elements are designated by the same reference signs, and duplicated description will be omitted.

Vehicle V is charged in parking lot A. Vehicle V can receive power from outside. Vehicle V may be, for example, a battery electric vehicle (BEV) or a plug-in hybrid electric vehicle (PHEV). Note that in this embodiment, the vehicle V is an automatic driving vehicle that can travel automatically.

Parking lot A is a charging station equipped with a plurality of power supply facilities C. A plurality of parking spaces P is provided in the parking lot. Parking space P is a space for parking vehicle V for power supply. Each of the plurality of parking spaces P is provided with one power supply facility C. In this embodiment, the power supply facility C includes a power supply cable K for supplying power to the vehicle V. The power supply facility C can supply power to the vehicle V with the power supply cable K connected to the vehicle V. The vehicle V charges its on-vehicle battery using electric power supplied from the power supply facility C.

Here, the power supply facility C includes a first power supply facility C1 having a data communication function for performing data communication with the vehicle V, and a second power supply facility C2 having no data communication function. The data communication function here is a communication function for providing software update data of an in-vehicle ECU mounted on the vehicle V from the power supply facility C to the vehicle V. Hereinafter, among the parking spaces P, the parking space P in which the first power supply facility C1 is provided is referred to as a first parking space P1, and the parking space P in which the second power supply facility C2 is provided is referred to as a second parking space P2.

That is, the first power supply facility C1 having a data communication function that provides the vehicle V with software update data for the in-vehicle ECU is provided in the first parking space P1. The second parking space P2 is provided with a second power supply facility C2 that does not have the data communication function.

The first power supply facility C1 having a data communication function can transmit software update data for the in-vehicle ECU to the vehicle V via a power supply cable K connected to the vehicle V for power supply. The first power supply facility C1 can transmit the update data to the vehicle V by superimposing the update data on the power path of the power supply cable K, for example. The first power supply facility C1 may store update data to be transmitted to the vehicle V in advance. Further, the first power supply facility C1 may obtain update data to be transmitted to the vehicle V from an external server or the like.

Figure 1:
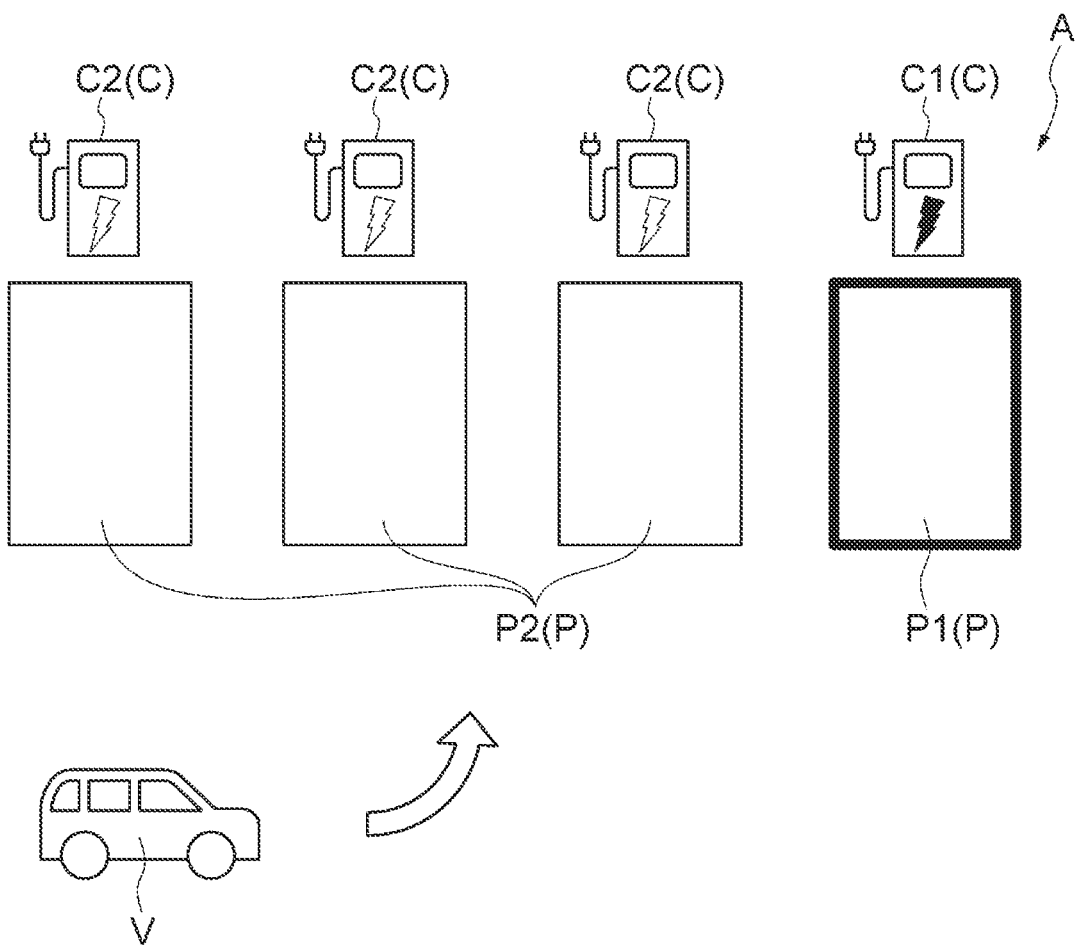
FIG. 1 is a schematic diagram showing a situation where a vehicle is supplied with power in a parking lot.

In this way, in the parking lot A, the first power supply facility C1 having the data communication function and the second power supply facility C2 not having the data communication function coexist. Note that FIG. 1 shows a case where one first power supply facility C1 and three second power supply facilities C2 are provided in the parking lot A. The number of first power supply facilities C1 and second power supply facilities C2 is not limited to the number shown in FIG. 1.

Figure 2:
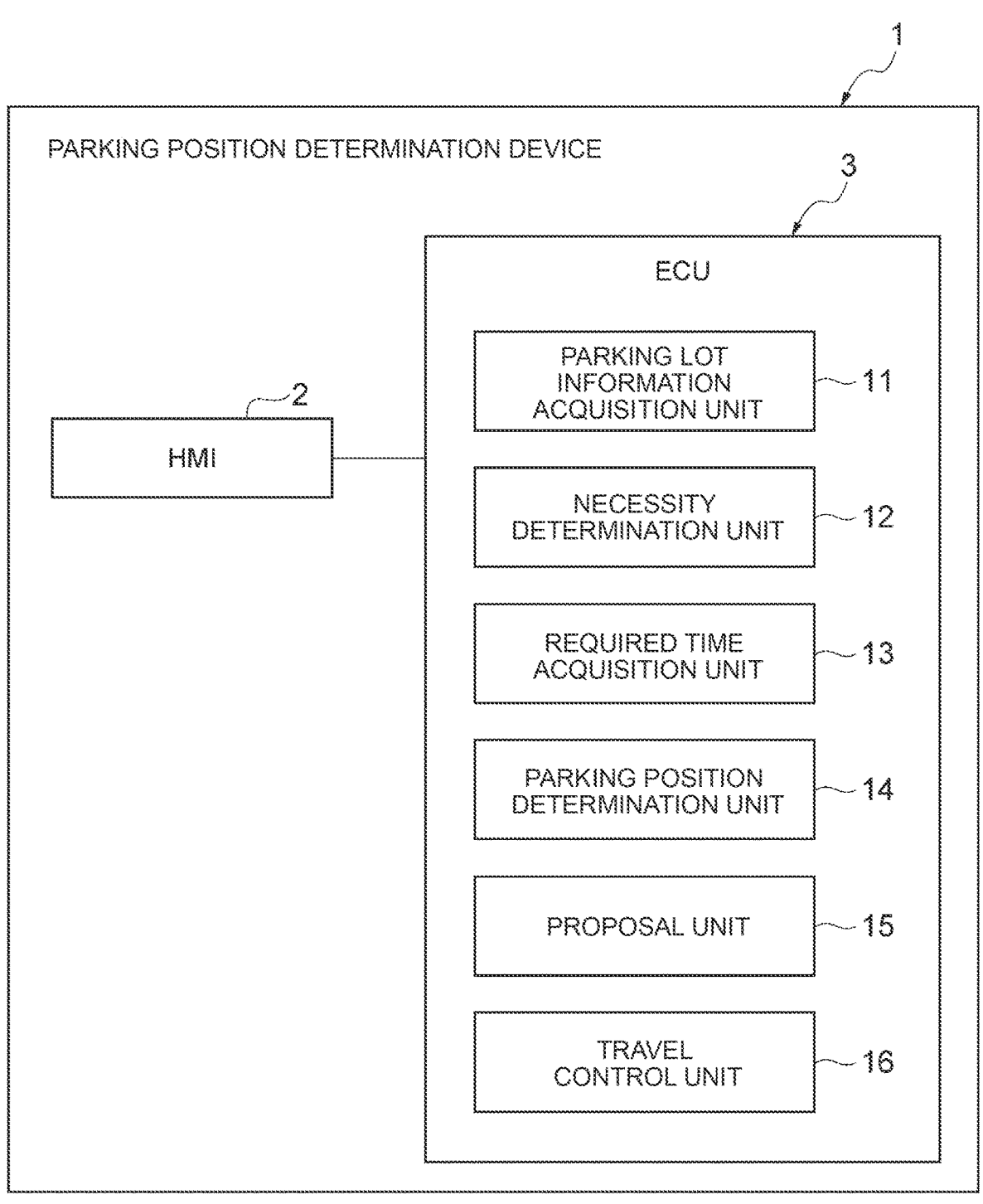
FIG. 2 is a block diagram showing a parking position determination device according to an embodiment.

Hereinafter, a configuration for determining the parking space P in which the vehicle V should park when the vehicle V receives power from the power supply facility C in the parking lot A will be described. The vehicle V is equipped with a parking position determination device 1 shown in FIG. 2. The parking position determination device 1 performs a process of determining the parking position (parking space P) of a vehicle V to be parked for power supply in the parking lot A.

The parking position determination device 1 includes a Human Machine Interface (HMI) 2 and an Electronic Control Unit (ECU) 3. The HMI 2 is an interface for inputting and outputting information between the parking position determination device 1 and the occupant of the vehicle V.

ECU 3 is an electronic control unit that includes a Central Processing Unit (CPU), Read Only Memory (ROM), Random Access Memory (RAM), etc. The ECU 3 realizes various functions by, for example, loading a program recorded in a ROM into a RAM, and executing the program loaded into the RAM by a CPU. Functionally, the ECU 3 includes a parking lot information acquisition unit (vacancy information acquisition unit) 11, a necessity determination unit 12, a required time acquisition unit 13, a parking position determination unit 14, a proposal unit 15, and a travel control unit 16.

The parking lot information acquisition unit 11 acquires parking lot information regarding the parking space P. This parking lot information includes, for example, position information and the number of installations of each of the first parking space P1 and the second parking space P2. Furthermore, the parking lot information includes information on availability of the first parking space P1 and the second parking space P2 (information on whether or not there are parked vehicles). The parking lot information acquisition unit 11 can acquire parking information from, for example, a management device that manages the status of the parking lot A via wireless communication or the like. The parking position determination device 1 may store information such as the position information and the number of installations of each of the first parking space P1 and the second parking space P2 in advance.

The necessity determination unit 12 determines whether the software of the in-vehicle ECU mounted on the vehicle V needs to be updated. This in-vehicle ECU has a function of updating software using update data. The in-vehicle ECU here may be the ECU 3 of the parking position determination device 1, or may be an ECU provided in an in-vehicle device other than the parking position determination device 1. The necessity determination unit 12 may determine whether updating is necessary, for example, based on version information of the software of the in-vehicle ECU and version information of update data that can be provided by the first power supply facility C1. The version information of the update data may be included in the parking lot information acquired by the parking lot information acquisition unit 11, or may be acquired by other methods.

The required time acquisition unit 13 acquires the charging time required to charge the on-board battery of the vehicle V. Here, the charging time may be calculated based on the remaining battery level of the vehicle-mounted battery. The time required to charge the vehicle-mounted battery may be defined as the time required for the vehicle-mounted battery to reach a predetermined remaining battery level. For example, the required time acquisition unit 13 may acquire the charging time from a battery management device that manages the charging state of the in-vehicle battery.

Further, the required time acquisition unit 13 acquires the required update time required for the in-vehicle ECU to receive update data from the first power supply facility C1 and update the software. The required update time may be determined based on, for example, the amount of update data, the data rewriting speed of the in-vehicle ECU, and the like.

Based on the parking lot information acquired by the parking lot information acquisition unit 11, the parking position determination unit 14 determines the parking position where the vehicle V is parked for power supply, among the first parking space P1 and the second parking space P2. Here, the parking position determination unit 14 determines the first parking space P1 as the parking position of the vehicle V when the necessity determination unit 12 determines that the software needs to be updated. Further, when the necessity determination unit 12 determines that software updating is not necessary, the parking position determination unit 14 determines the second parking space P2 as the parking position of the vehicle V.

Here, the parking position determination unit 14 can determine the parking position of the vehicle V by also taking into consideration the parking space availability information included in the parking information. Specifically, if the necessity determination unit 12 determines that the software needs to be updated and it determines that there is a vacant space in the first parking space P1 based on the vacant information, the parking position determination unit 14 determines the first parking space P1 as the parking position of vehicle V. In addition, even if it is determined that the software needs to be updated, the parking position determination unit 14 may determine the second parking space P2 as the parking position of the vehicle V if there is no vacant space in the first parking space P1.

In addition, when the necessity determination unit 12 determines that the software update is not necessary and determines that there is a vacant space in the second parking space P2 based on the vacant information, the parking position determination unit 14 determines the second parking space P2 as the parking position of vehicle V. In addition, even if it is determined that the software update is not necessary, the parking position determination unit 14 may determine the first parking space P1 as the parking position of the vehicle V if there is no vacant space in the second parking space P2.

Furthermore, the parking position determination unit 14 can determine the parking position of the vehicle V by also considering the charging time and the required update time acquired by the required time acquisition unit 13. Specifically, even if it is determined that the software needs to be updated, if the charging time is shorter than the required update time, the parking position determination unit 14 uses the second parking space P2 to park the vehicle V. Determine as the position.

The proposal unit 15 proposes (notifies) the parking space P determined by the parking position determination unit 14 to the occupant of the vehicle V using the HMI 2. Thereby, the occupant of the vehicle V can recognize the parking space P in which the vehicle should be parked. The occupant of vehicle V can respond to the proposal. For example, the occupant of the vehicle V inputs via the HMI 2 whether to permit parking in the parking space P proposed by the proposal unit 15. The occupant may input through the HMI 2 that the vehicle should be parked in a parking space P other than that proposed by the proposal unit 15. The proposal unit 15 accepts the occupant's answers input through the HMI 2.

The travel control unit 16 controls the vehicle V to automatically travel. The travel control unit 16 can automatically cause the vehicle V to travel to the first parking space P1 or the second parking space P2 determined by the parking position determination unit 14. Here, the travel control unit 16 automatically causes the vehicle V to travel based on the occupant's response received by the proposal unit 15.

For example, if the response is that the occupant of the vehicle V allows parking in the parking space P proposed by the proposal unit 15, the travel control unit 16 allows the vehicle to move to the parking space P determined by the parking position determination unit 14. Make V run automatically. On the other hand, when the occupant of the vehicle V inputs that the vehicle V should be parked in a parking space P other than the one proposed by the proposal unit 15, the travel control unit 16 automatically moves the vehicle V to the parking space P specified by the occupant.

Thereafter, the occupants of the vehicle V charge the on-board battery of the vehicle V using the power supply facility C installed in the parking space P where the vehicle V is parked. Note that when the power supply facility C is the first power supply facility C1, the first power supply facility C1 transmits software update data to the vehicle V via the power supply cable K. Thereby, the in-vehicle ECU of the vehicle V can perform an update process based on the update data transmitted from the first power supply facility C1.

Figure 3:
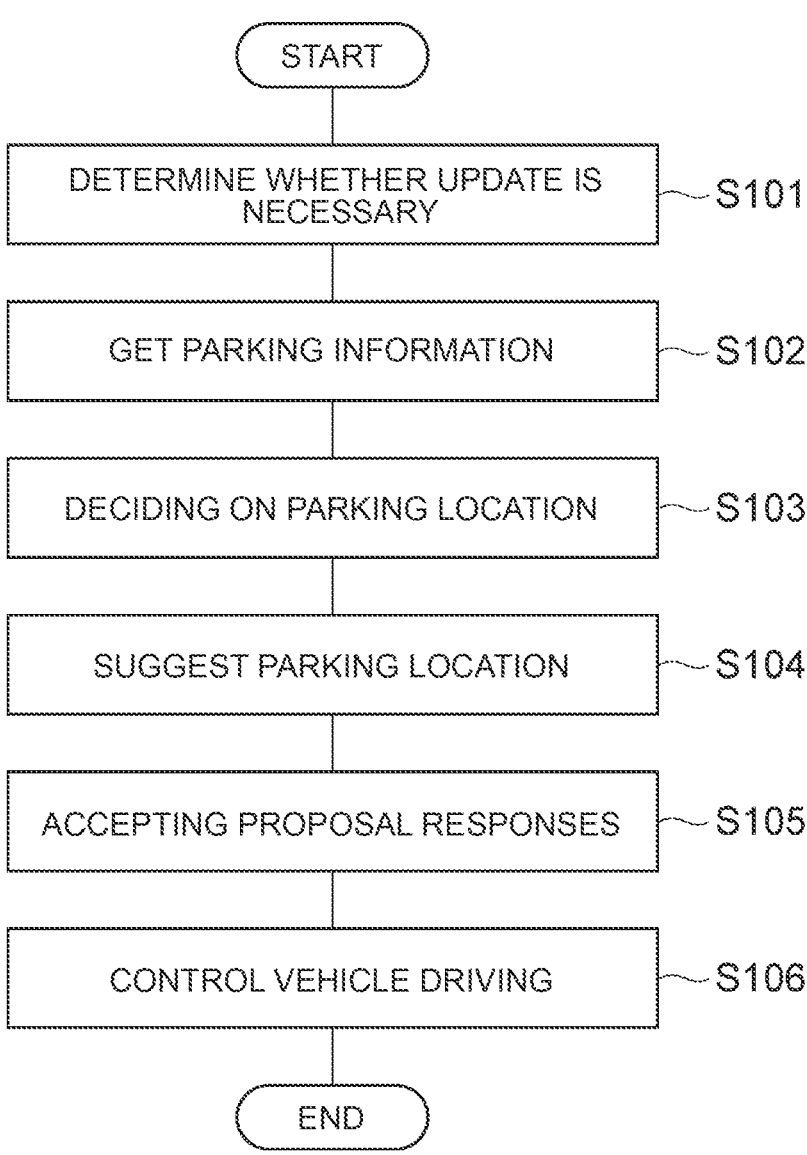
FIG. 3 is a flowchart showing the flow of parking position determination processing performed by the parking position determination device.

Next, the flow of the process of determining the parking position of the vehicle V performed in the parking position determination device 1 will be explained. The flowchart shown in FIG. 3 is started, for example, when vehicle V arrives at parking lot A. However, part of the processing shown in FIG. 3 may be performed before arriving at parking lot A. Further, the order of processing is not limited to the order shown in FIG. 3 either.

As shown in FIG. 3, the necessity determination unit 12 determines whether it is necessary to update the software of the in-vehicle ECU mounted on the vehicle V (S101). The parking lot information acquisition unit 11 acquires parking lot information about the parking lot A that supplies power to the vehicle V (S102). The parking position determination unit 14 determines the parking position of the vehicle V among the plurality of parking spaces P (S103).

The proposal unit 15 proposes the parking space P determined by the parking position determination unit 14 to the occupant of the vehicle V using the HMI 2 (S104). Based on this proposal, the occupant of vehicle V responds to the proposal via HMI 2. The travel control unit 16 receives the answer input by the occupant through the HMI 2 (S105). Then, the travel control unit 16 automatically drives the vehicle V to a predetermined parking space P according to the answer from the occupant, and parks the vehicle V in the parking space P (S106).

Thereby, the occupants of the vehicle V can be supplied with power using the power supply facility C provided in the parking space P where the vehicle V is parked. When this power supply facility C is the first power supply facility C1, the first power supply facility C1 transmits update data to the vehicle V via the power supply cable K. The in-vehicle ECU of the vehicle V can perform update processing based on the update data transmitted from the first power supply facility C1.

As described above, the parking position determination device 1 includes the necessity determination unit 12 that determines whether or not it is necessary to update the software of the in-vehicle ECU. Then, the parking position determination unit 14 of the parking position determination device 1 determines the first parking space P1 as the parking position when it is determined that the update is necessary, and determines the second parking space P2 as the parking position when it is determined that the update is not necessary. As a result, the parking position determination device 1 can appropriately determine the parking position of the vehicle V that parks for power supply in the parking lot A where the first power supply facility C1 having a data communication function and the second power supply facility C2 not having the data communication function coexist.

Furthermore, the parking position determination unit 14 can determine the parking position of the vehicle V based on the availability information of the parking space P included in the parking lot information. Thereby, the parking position determination device 1 can more appropriately determine the parking position of the vehicle V while taking into consideration the availability of the parking space P.

The travel control unit 16 automatically causes the vehicle V to travel to a predetermined parking space P, such as the parking space P determined by the parking position determination unit 14, according to the response from the occupant. Thereby, in the parking position determination device 1, it is not necessary for the occupant of the vehicle V to perform a driving operation, and the convenience is improved.

The first power supply facility C1 transmits update data to the vehicle V via a power supply cable K connected to the vehicle V for power supply. In this case, it becomes unnecessary to provide a dedicated communication device for transmitting update data.

The parking position determination unit 14 can determine the parking position of the vehicle V, also taking into account the charging time and the required update time acquired by the required time acquisition unit 13. Specifically, even if it is determined that the software needs to be updated, if the charging time is shorter than the required update time, the parking position determination unit 14 uses the second parking space P2 to park the vehicle V. Determine as the position. In other words, the case where this charging time is shorter than the update required time is the case where the updating process of the software of the in-vehicle ECU does not end even if charging of the on-board battery of the vehicle V is completed. In this case, for example, even though the vehicle battery has been fully charged, the vehicle V may not be able to start (the power supply cable K may be removed) because the update process has not been completed. In this way, the parking position determination device 1 can more appropriately determine the parking position of the vehicle V by also considering the charging time and the required update time.

Although the embodiments of the present disclosure have been described above, the present disclosure is not limited to the above embodiments. For example, the parking position determination device 1 is not limited to automatically driving the vehicle V to the parking space P. The parking position determination device 1 may be configured to perform processing up to notifying the occupant of the vehicle V of the parking space P determined by the parking position determination unit 14. In this case, the vehicle V is not limited to being an automatic driving vehicle that can travel automatically.

Further, the first power supply facility C1 is not limited to a configuration in which update data is transmitted using the power supply cable K. For example, the first power supply facility C1 may communicate with the vehicle V using a communication-dedicated cable other than the power supply cable K. For example, the first power supply facility C1 may communicate with the vehicle V by wireless communication using a wireless communication device provided in the first parking space P1.

What is claimed is:

1. A parking position determination device that determines a parking position of a vehicle parked for power supply in a parking lot including a first parking space provided with a first power supply facility having a data communication function that provides update data for software of an in-vehicle ECU to the vehicle, and a second parking space provided with a second power supply facility that does not have the data communication function, the parking position determination device comprising a processor configured to determine whether the software needs to be updated, determine the first parking space as the parking position of the vehicle in a case where determination is made that the software needs to be updated, determine the second parking space as the parking position of the vehicle in a case where determination is made that the software does not need to be updated, and automatically cause the vehicle to travel to the first parking space or the second parking space determined by the processor.

2. The parking position determination device according to claim 1, wherein the processor is configured to acquire vacancy information of the first parking space and the second parking space, determine the first parking space as the parking position of the vehicle in a case where determination is made that the software needs to be updated and the first parking space is vacant based on the vacancy information, and determine the second parking space as the parking position of the vehicle in a case where determination is made that the software does not need to be updated and the second parking space is vacant based on the vacancy information.

3. The parking position determination device according to claim 1, wherein the first power supply facility transmits the update data to the vehicle via a power supply cable connected to the vehicle.

4. The parking position determination device according to claim 1, wherein the processor is configured to acquire a charging time required to charge an in-vehicle battery of the vehicle, and a required update time required for the in-vehicle ECU to receive the update data from the first power supply facility and update the software, and determine the second parking space as the parking position of the vehicle in a case where the charging time is shorter than the required update time, even when determination is made that the software needs to be updated.

* * * * *